United States Patent [19]
Graham

[11] Patent Number: 5,314,058
[45] Date of Patent: May 24, 1994

[54] VIBRATORY DRIVE UNIT

[76] Inventor: S. Neal Graham, 365 Beechwood Dr., Noblesville, Ind. 46060

[21] Appl. No.: 7,255

[22] Filed: Jan. 21, 1993

[51] Int. Cl.⁵ .............................................. B65G 27/32
[52] U.S. Cl. .................................... 198/753; 198/760
[58] Field of Search ............... 198/753, 756, 757, 769, 198/760

[56] References Cited

U.S. PATENT DOCUMENTS

| | | |
|---|---|---|
| 2,746,599 | 5/1956 | Weyandt . |
| 2,964,182 | 12/1960 | Spurlin . |
| 2,985,280 | 5/1961 | Burgess, Jr. . |
| 3,007,565 | 11/1961 | Yoshikawa . |
| 3,011,625 | 12/1961 | Bailey et al. . |
| 3,127,001 | 3/1964 | Ferris . |
| 3,133,627 | 5/1964 | Lenders et al. . |
| 3,258,111 | 6/1966 | Spurlin et al. . |
| 3,322,260 | 5/1967 | Schwenzfeier . |
| 3,447,660 | 6/1969 | Winans . |
| 3,587,833 | 6/1969 | Byrum ................................ 198/753 |
| 3,599,783 | 6/1969 | Burgess, Jr. . |
| 3,658,172 | 4/1972 | Hacker . |
| 3,966,040 | 6/1976 | Hazelwood . |
| 4,181,216 | 1/1980 | Cipu . |
| 4,239,103 | 12/1980 | Feldpausch . |

OTHER PUBLICATIONS

Informational Brochure "Powered Base Units/XL Base Unit" Informational Brochure Syntron Parts Handling Vibrating Base Units EB Series (no date given).

*Primary Examiner*—D. Glenn Dayoan
*Attorney, Agent, or Firm*—Woodard, Emhardt, Naughton, Moriarty & McNett

[57] ABSTRACT

A bidirectional vibratory drive unit is disclosed for use with vibratory driven feeder bowls and parts separators, including a base member having first and second pluralities of lower spring mount pads and a top member having corresponding first and second pluralities of upper spring mount pads. A plurality of springs alternatively attach between the first plurality of upper spring mount pads and the first plurality of lower spring mount pads or between the second plurality of upper spring mount pads and the second plurality of lower spring mount pads to change the bias of the top member relative to the base member. Electromagnetic coils are alternatively attachable to the base member and are operable in cooperation with the springs to vibrate the top member in alternative first or second driven directions relative to the base member.

9 Claims, 3 Drawing Sheets 5,314,058

VIBRATORY DRIVE UNIT

BACKGROUND OF THE INVENTION

This invention relates generally to article feed mechanisms and sorters and, more specifically, to drive units for use with vibratory feeder bowls and parts separators.

Vibratory feeder bowls and parts separators typically urge parts upwardly along a spiral path by vibrating the spiral path both axially along and rotationally about its central axis. As such, vibratory drive or base units are required to provide the necessary vibratory motion and, in many instances, are provided as separate attachable units. Prior art vibratory drive units have heretofore focused generally on improvements in the overall combination drive unit and feeder bowl and/or parts separator, rather than on improvements to the particular vibratory drive unit. Examples of these devices can be found in U.S. Pat. No. 4,239,103 to Feldpausch, U.S. Pat. No. 3,966,040 to Hazelwood, U.S. Pat. No. 2,964,182 to Spurlin and U.S. Pat. No. 3,007,565 to Yoshikawa.

Still other devices have attempted to provide a universal vibratory drive unit which, in and of itself, has a reduced overall size and weight and is compatible with a variety of different feed bowls and/or parts separators. For example, some drive units include both peripheral and central mounting arrangements compatible with different feeder bowl mounting arrangements.

Nevertheless, there is always a need for an improved universal vibratory drive unit. For example, because vibratory feeder bowls and parts separators may not always have a common driven direction of rotation (i.e., clockwise or counterclockwise), is desirable to have a vibratory drive unit which is compatible with both clockwise and counterclockwise driven feeder bowls and parts separators. Further, such a vibratory drive unit should have a reduced overall size and weight.

SUMMARY OF THE INVENTION

According to one embodiment of the present invention, a bidirectional vibratory drive unit for use with vibratory feed bowls and parts separators is provided which includes a base member, a top member adapted for mounting a vibratory driven device thereon and means for biasing the top member in alternative first or second biases relative to the base member. The means for biasing includes means for supporting the top member approximately level above the base member. There is provided means for rotating the top member in alternative first or second directions of rotation relative to the base member as well as means for changing the bias of the means for biasing between the first bias. The apparatus further includes means for changing the direction of rotation of the means for rotating between the first direction of rotation and the second direction of rotation, wherein the means for rotating is operable with the means for biasing in the first direction of rotation and the first bias to vibrate the top member in a first driven direction, and wherein the means for rotating is operable with the means for biasing in the second direction of rotation and the second bias to vibrate the top member in a second driven direction.

One object of the present invention is to provide an improved vibratory drive unit for use with vibratory feeder bowls, parts separators and the like.

Another object of the present invention is to provide a bidirectional vibratory drive unit compatible with both clockwise and counterclockwise driven devices.

Yet another object of the present invention is to provide a vibratory drive unit having a reduced overall size and weight.

These and other related objects and advantages will become apparent from the following drawings and written description.

DESCRIPTION OF THE PREFERRED EMBODIMENT

Figure 1:
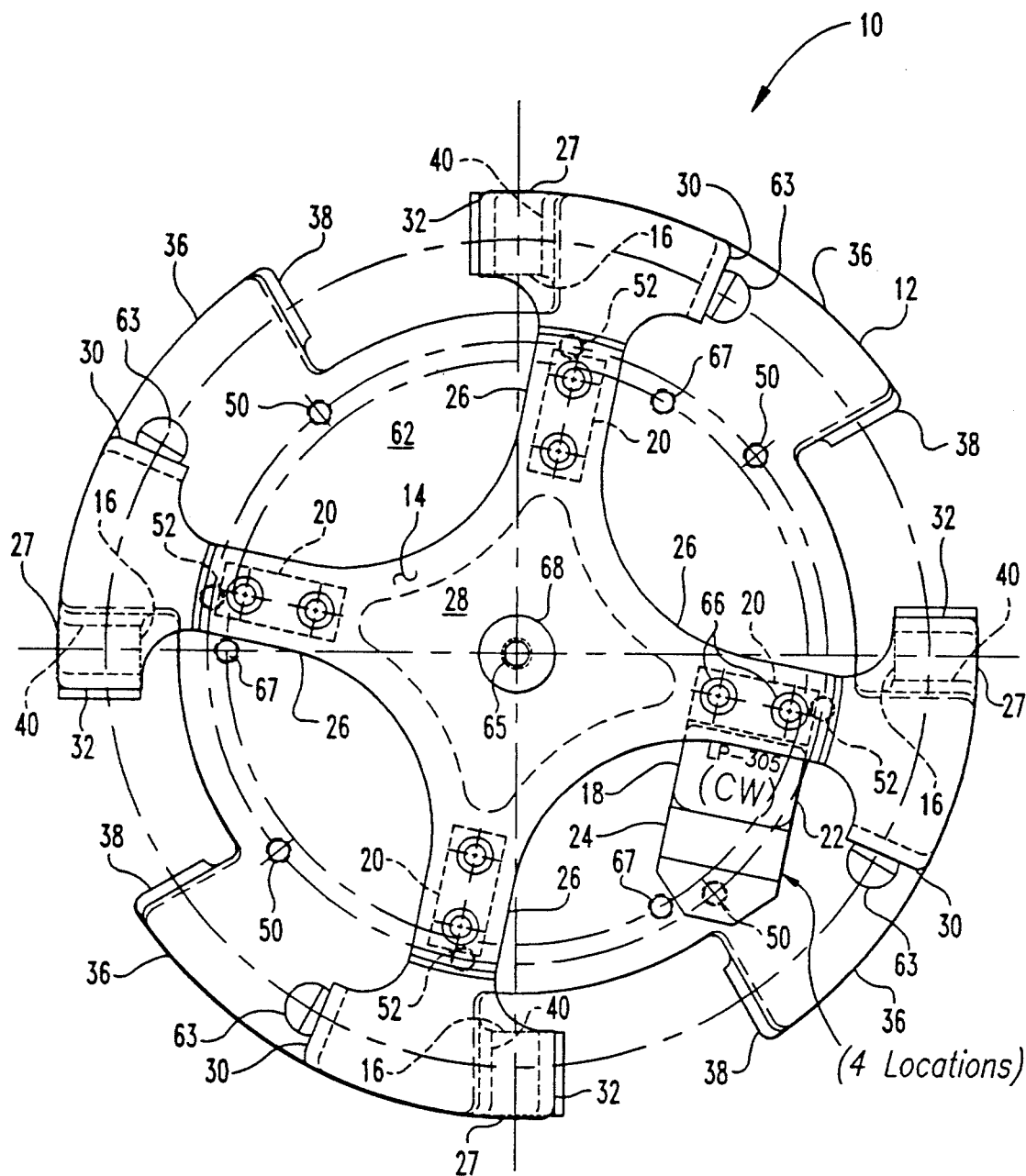
FIG. 1 is a top plan view of a bidirectional vibratory drive unit shown in its clockwise drive position according to one embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
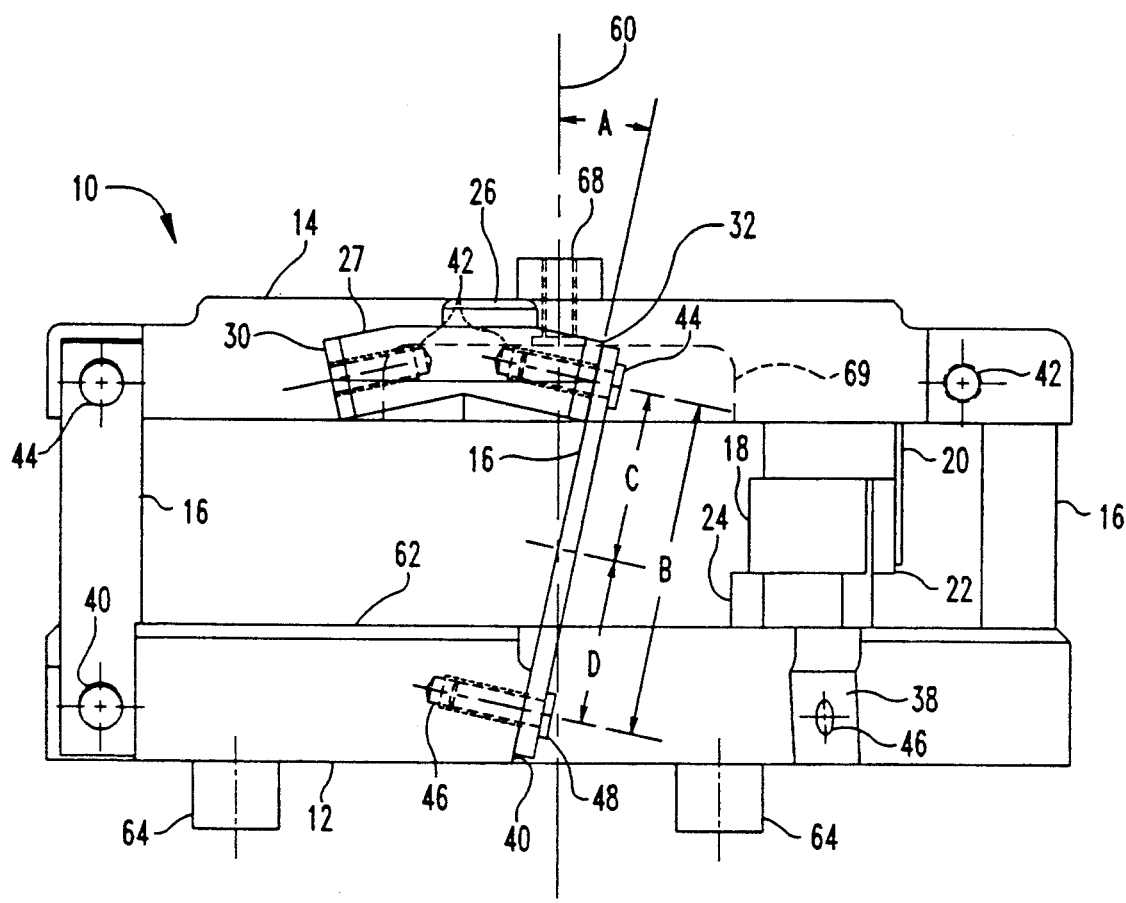
FIG. 2 is a side elevational view of the bidirectional vibratory drive unit shown in FIG. 1.

Referring now to FIGS. 1 and 2, a vibratory drive unit 10 is shown including a base member 12 and a top member 14. A plurality of spring members 16 are connected between top member 14 and base member 12. Spring members 16 provide both means for supporting top member 14 approximately level above base member 12 and means for biasing top member 14 relative to base member 12. In the preferred embodiment, four spring members 16 are employed spaced opposite each other at 90 degree intervals.

Means for rotating top member 14 relative to base member 12 is provided by a plurality of electromagnetic devices 18 operable with a corresponding plurality of ferrous striker plates 20. In the preferred embodiment, four electromagnetic devices 18 are employed mounted to base member 12 at 90 degree intervals corresponding to the four spring members 16. Each of electromagnetic devices 18 includes a conventional electrical coil 22 mounted to base member 12 via an L-shaped bracket 24. Each of striker plates 20 is mounted to top member 14 adjacent to a corresponding electrical coil 22. Electromagnetic devices 18 operate in a conventional manner by providing an electromagnetic field when electric coils 22 are energized to attract striker plates 20 towards coils 22, thereby rotating top member 14 in a clockwise direction relative to base member 12 against the combined spring force provided by spring members 16. The air gap between coils 22 and striker plates 20 is adjustable to control the vibration imparted to the vibratory driven unit, such as a feeder bowl. Preferably, the air gap is adjustable between 0.010 inches and 0.060 inches depending on the amplitude required. Because spring members 16 are mounted at an angle corresponding to the driven direction of rotation, the clockwise rotation causes the spring members to also move top member 14 vertically relative to base member 12. When electrical coils 22 are deenergized, spring members 16 release top member 14 to move in an opposite vertical direction and to rotate top member 14 in a counterclockwise direction to return it to its initial position. By cycling electrical coils between energized and deenergized states, electromagnetic devices 18 cooperate with spring members 16 to induce both an axial and rotational vibratory or oscillating motion in top member 14 relative to base member 12.

Unlike previous vibrating bases, vibratory drive unit 10 is bidirectionally configured and, therefore, compatible with both clockwise and counterclockwise driven vibratory feeder bowls, parts separators and the like. As depicted in FIGS. 1 and 2, spring members 16 and electromagnetic devices 18 are mounted in first positions to vibrate top member 14 in a clockwise driven direction of rotation about base member 12. Spring members 16 and electromagnetic devices 18 include second alternative mounting positions to drive top member 14 in a counterclockwise driven direction of rotation about base member 12. In the preferred embodiment, fasteners attach the spring members to one of two sets of spring mounting pads to change the rotational bias associated with the clockwise and counterclockwise driven directions of rotation. Similarly, fasteners attach L-shaped brackets 24 at one of two mounting locations on base member 12 for changing the electromagnetically driven direction of rotation between clockwise and counterclockwise driven directions of rotation.

Turning now to the individual components of vibratory drive unit 10 in greater detail, top member 14 includes a plurality of cross-arms or spokes 26 extending radially from a central portion 28. In the preferred embodiment, four cross-arms or spokes are provided corresponding to the number of spring members 16. Each spoke 26 further includes a striker plate 20 mounted to its underneath side and disposed adjacent to a corresponding electromagnetic device 18. Striker plates 20 are bidirectional; that is, each side of the striker plate provides an operable surface for engaging with a corresponding electromagnetic device. As such, the driven direction of rotation of top member 14 is changed between clockwise and counterclockwise merely by switching the mounting locations of electromagnetic devices 18 across the faces or sides of striker plate 20.

Each spoke 26 further includes radial ends 27 having alternative first and second upper spring mount pads 30 and 32 corresponding to counterclockwise and clockwise driven directions of rotation of top member 14, respectively. Base member 12 similarly includes crossfeet or spokes 36 corresponding to spokes 26 of top member 14. Each spoke 36 includes first and second lower spring mount pads 38 and 40 corresponding to spring mount pads 30 and 32 of top member 14, respectively. As shown in FIGS. 1 and 2, spring members 16 attach between lower spring mount pads 40 and upper spring mount pads 32 and are angled to bias top member 14 both axially and rotationally relative to base member 12. To change the bias of top member 14, spring members 16 are attached between upper spring mount pads 30 and lower spring mount pads 38.

Each of upper spring mount pads 30 and 32 includes means for attaching spring members 16 thereto, including a threaded hole 42 and corresponding fastener 44. Similar threaded holes and fasteners, 46 and 48 respectively, are provided at each of lower spring mount pads 38 and 40. To accommodate opposing threaded holes 42 in ends 27 of spoke 26, ends 27 are provided with added radial length.

In addition to providing alternative mounting locations for spring members 16, base member 12 further includes alternative mounting locations for electromagnetic devices 18 corresponding to clockwise and counterclockwise driven directions of rotation. Preferably, the mounting locations permit the electromagnetic devices to be mounted inboard of spokes 36, thereby minimizing the overall envelope of vibratory drive unit 10. Threaded mounting holes 50 are provided at four locations to mount each of L-shaped brackets 24 with coils 22 adjacent to a corresponding striker plate 20 to rotate top member 14 in a clockwise driven direction of rotation. Conversely, four alternative mounting holes 52 are provided for alternatively mounting electromagnetic devices 18 to rotate top member 14 in a counterclockwise driven direction of rotation. Therefore, simply by changing the attachment positions of spring members 16 and electromagnetic devices 18, the driven direction of rotation of top member 14 can be changed between clockwise and counterclockwise directions.

Figure 3:
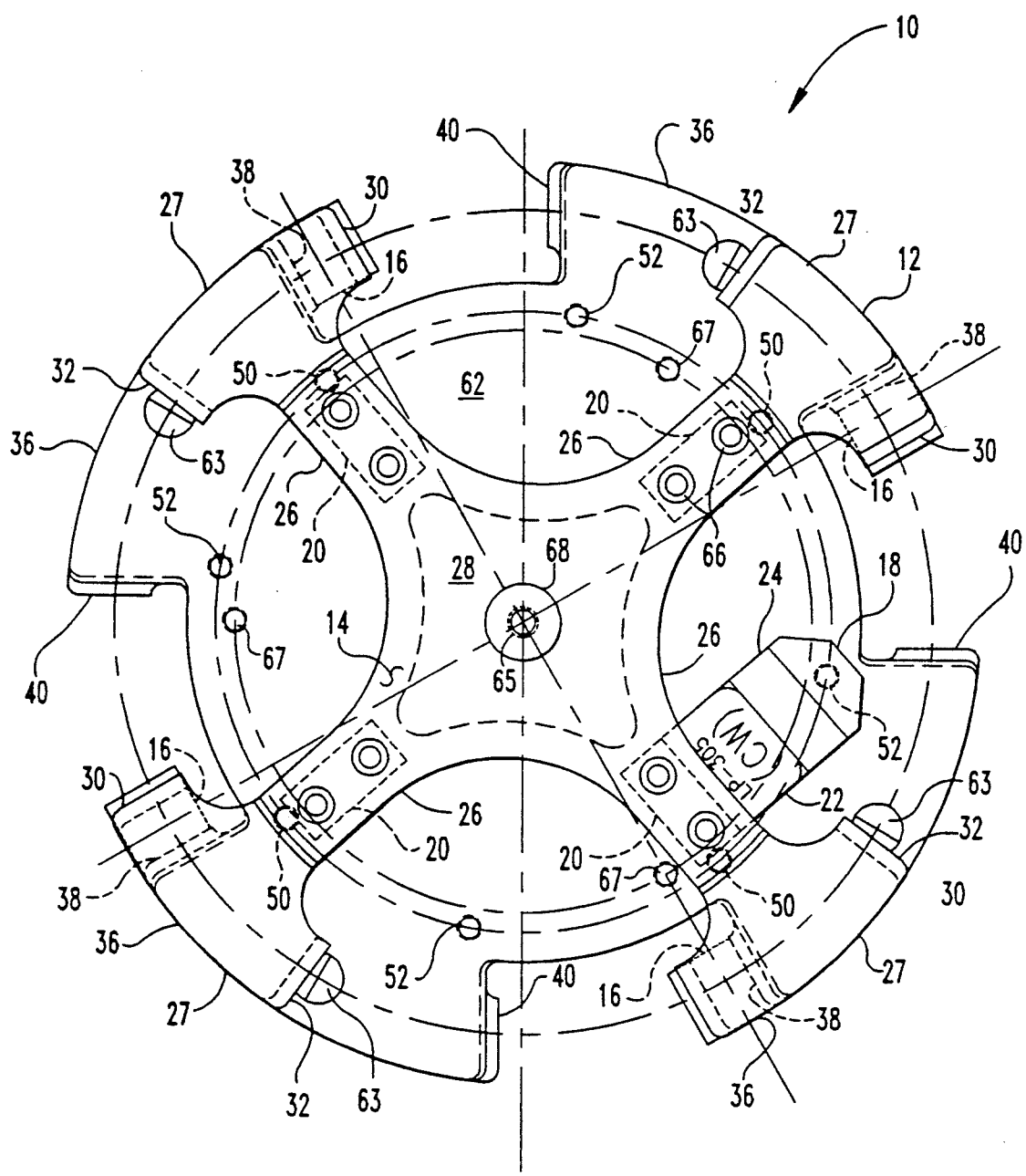
FIG. 3 is a top plan view of the bidirectional vibratory drive unit shown in FIG. 1 in its alternative counterclockwise drive position.

Referring now to FIG. 3, vibratory drive unit 10 is shown with spring members 16 and electromagnetic devices 18 mounted to drive top member 14 in a counterclockwise direction of rotation. In this alternative configuration, spring members 16 attach between upper spring mount pads 30 and lower spring mount pads 38, and electromagnetic devices 18 are mounted to base member 12 via mounting holes 52.

Referring back to FIG. 2, spring members 16 are mounted symmetrically between the upper and lower spring mount pads about central axis 60. In the preferred embodiment, spring members 16 are at an angle A of 12 degrees relative to central axis 60 and symmetric about central axis 60 with the length between spring mount pads B being equally divided about central axis 60; i.e., dimension C equal to dimension D. The 12 degree mounting of spring members 16 has been found to yield an optimum vibratory motion which balances the axial vibration and rotational vibration of top member 14 relative to base member 12.

Referring back to FIG. 1, base member 12 is constructed of 65-45-12 ductile iron and includes machined surfaces at each set of lower spring mount pads 38 and 40 and top surface 62. Each of lower spring mount pads 38 and 40 are machined at a 12° angle corresponding to angle A. Each spoke 36 of base member 12 further includes central through-holes 63 and the central portion of base member 12 includes through-hole 65 adapted for locking base member 12 in place relative to other structures. To dampen the transmission of vibration from vibratory drive unit 10 to other structures, rubber feet 64 are provided mounted to the underneath side of base member 12 via mounting holes 67.

In the preferred embodiment, base member 12 is approximately 9½" in diameter as measured across spokes 36 and 7" in diameter as measured between the spokes. Each of lower spring mounting pads 38 and 40 is approximately square with dimensions in the preferred embodiment of 0.875 by 0.875 inches. Each mounting pad includes a 5/16-24 by 1.13 inch deep tapped hole aligned within the spoke to receive a corresponding fastener approximately perpendicular to the mounting pad surface. In this specific embodiment, the hole depth does not exceed 1.25 inches in order to avoid break-out.

Top member 14 is similarly constructed of 65-45-12 ductile iron and includes mounting holes 66 and corresponding fasteners for attaching striker plates 20 to the underneath side of the spokes. Similar to base member 12, each of upper spring mount pads 30 and 32 is machined at a 12° angle and includes 5/16-24 tapped holes for attaching spring members 16 thereto. Top member 14 includes a locating post 68 extending upwardly from central portion 28 and a 5/16-24 tapped hole adapted for locating and attaching, for example, a feeder bowl to top member 14. Additionally, top member 14 includes a recess 69 to provide clearance for a fastener to extend through locating post 68 and to reduce the weight of the top member. Top member 14 may be constructed of aluminum to further reduce weight; however, threaded inserts are preferably employed with such an aluminum construction for attaching spring members 16 and the striker plates of electromagnetic devices 18.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

For example, other means for rotating the top member relative to the base member are contemplated besides electromagnetic means, including but not limited to a mechanical bidirectional drive motor centrally mounted on base member 12 and having an output shaft directed vertically upwards and mechanically connected to top member 14. Conversely, the drive motor may be mounted to top member 14 with its output shaft mechanically connected to bottom member 12. In either case, the bidirectional drive motor can be either conventionally electric or fluid powered with transmission means for switching between directions of driven rotations.

As another example, the mounting locations of electromagnetic devices 18 need not be switched between clockwise and counterclockwise driven directions of rotation. Instead, two devices 18 may be permanently mounted in a first position at two locations 50 and the other two devices may be permanently mounted in a second position at two opposite locations 52, wherein means for oscillating the top member in the first direction is provided by cyclically energizing and deenergizing the two electromagnetic devices mounted at locations 50 and means for oscillating the top member in the second direction is provided by cyclically energizing and deenergizing the two electromagnetic devices mounted at locations 52. As such, means for changing the direction of oscillation is provided by energizing and deenergizing alternate pairs of electromagnetic devices 18.

What is claimed is:

1. A bidirectional vibrating base for use with vibratory feeder bowls and parts separators comprising:
a base member;
a top member adapted for mounting a vibratory driven device thereon;
means for biasing said top member in alternative first or second biases relative to said base member, said means for biasing including means for supporting said top member approximately level above said base member;
means for rotating said top member in alternative first or second directions of rotation relative to said base member;
means for changing the bias of said means for biasing between said first bias and said second bias; and
means for changing the direction of rotation of said means for rotating between said first direction of rotation and said second direction of rotation;
wherein said means for rotating is operable with said means for biasing in said first direction of rotation and said first bias to vibrate said top member in a first driven direction, and wherein said means for rotating is operable with said means for biasing in said second direction of rotation and said second bias to vibrate said top member in a second driven direction;
wherein said means for biasing includes spring means for biasing said top member relative to said base member;
wherein said spring means for biasing includes a spring member attached between said top member and said base member;
said means for changing the bias includes first upper and lower spring mount pads and second upper and lower spring mount pads and means for alternatively attaching said spring member between said first upper and lower spring mount pads and between said second upper and lower spring mount pads, said spring member being attached between said first upper and lower spring mount pads corresponding to said first driven direction and being attached between said second upper and lower spring mount pads corresponding to said second driven direction;
wherein said means for supporting includes a plurality of said spring members attached between said top member and said base member; and
said means for changing the bias includes first pluralities of upper and lower spring mount pads and second pluralities of upper and lower spring mount pads and means for alternatively attaching said plurality of spring members between said first pluralities of upper and lower spring mount pads and between said second pluralities of upper and lower spring mount pads;
wherein said means for rotating includes pulsed electromagnetic means for intermittently rotating said top member relative to said base member,
wherein said pulsed electromagnetic means includes an electromagnetic coil having energized and deenergized states and operable with a striker plate; and said electromagnetic coil magnetically attracts said striker plate in said energized state to rotate said top member relative to said base member;
wherein said striker plate includes first and second sides corresponding to said first and second driven directions; and
said means for changing the direction of rotation includes means for attaching said electromagnetic coil adjacent to either of said first or second sides of said striker plate.

2. A bidirectional vibrating base for use with vibratory feeder bowls and parts separators comprising:
a base member;
a top member adapted for mounting a vibratory driven device thereon;
means for biasing said top member in alternative first or second biases relative to said base member, said means for biasing including means for supporting said top member approximately level above said base member;

means for rotating said top member in alternative first or second directions of rotation relative to said base member;

means for changing the bias of said means for biasing between said first bias and said second bias; and means for changing the direction of rotation of said means for rotating between said first direction of rotation and said second direction of rotation;

wherein said means for rotating is operable with said means for biasing in said first direction of rotation and said first bias to vibrate said top member in a first driven direction, and wherein said means for rotating is operable with said means for biasing in said second direction of rotation and said second bias to vibrate said top member in a second driven direction;

wherein said means for rotating includes pulsed electromagnetic means for intermittently rotating said top member relative to said base member;

wherein said pulsed electromagnetic means includes an electromagnetic coil having energized and deenergized states and operable with a striker plate; and said electromagnetic coil magnetically attracts said striker plate in said energized state to rotate said top member relative to said base member;

wherein said striker plate includes first and second sides corresponding to said first and second driven directions; and said means for changing the direction of rotation includes means for attaching said electromagnetic coil adjacent to either of said first or second sides of said striker plate.

3. A bidirectional vibrating base for use with vibratory feeder bowls and parts separators comprising:

a base member, said base member including first and second pluralities of lower spring mount pads;

a top member, said top member including first and second pluralities of upper spring mount pads corresponding to said first and second pluralities of lower spring mount pads, respectively;

a plurality of spring members alternately attachable between said top member and said base member.

means for alternatively attaching said plurality of spring members between said first plurality of upper spring mount pads and said first plurality of lower spring mount pads or between said second plurality of upper spring mount pads and said second plurality of lower spring mount pads to change the bias of said top member relative to said base member;

means, cooperative with said plurality of spring members, for oscillating said top member relative to said base member, said means for oscillating including means for driving said top member in alternative first or second directions;

wherein said means for oscillating includes a plurality of electromagnetic coils attached to said base member and a corresponding plurality of striker plates attached to said top member;

said plurality of electromagnetic coils having energized and deenergized states and operable with said plurality of striker plates in said energized state to magnetically attract said plurality of striker plates;

wherein each of said plurality of striker plates includes first and second sides corresponding to said first and second directions; and each of said plurality of electromagnetic coils is alternatively attachable to said base member adjacent to either of said first or second sides of a corresponding one of said plurality of striker plates.

4. The bidirectional vibrating base of claim 3, wherein:

said base member is circular in shape and includes a first plurality of spokes extending radially therefrom, said first plurality of lower spring mount pads corresponding to and being arranged one-for-one on said first plurality of spokes and said second plurality of lower spring mount pads corresponding to and being arranged one-for-one on said first plurality of spokes opposite said first plurality of lower spring mount pads;

said top member is circular in shape and includes a second plurality of spokes extending radially therefrom and corresponding to said first plurality of spokes, said first plurality of upper spring mount pads corresponding to and being arranged one-for-one on said second plurality of spokes and said second plurality of upper spring mount pads corresponding to and being arranged one-for-one on said second plurality of spokes opposite said first plurality of upper spring mount pads.

5. A bidirectional vibrating base for use with vibratory feeder bowls and parts separators comprising a base member;

a top member adapted for mounting a vibratory driven device thereon;

power means for driving said top member relative to said base member;

a plurality of spring members extending between and connecting said base member and said top member, each spring member of said plurality of spring members being mountable in a first position in which parts are fed in a clockwise direction and in a second position win which parts are fed in a counter-clockwise direction;

each of said spring members being bolted directly to said base when in said first position and when in second position.

6. The bidirectional vibrating base of claim 5, wherein:

said top member is a rigid homogeneous member having spring mounting locations thereon allowing mounting of said spring members in said first position and in said second position.

7. The bidirectional vibrating base of claim 5, wherein:

said base member has sufficient space between said first spring positions and said second spring positions to allow access for tools into said space to mount said springs in said first and second positions.

8. The bidirectional vibrating base of claim 5, wherein:

said springs are at an angle of 12 degrees to the vertical.

9. The bidirectional vibrating base of claim 6, wherein:

said top member has spokes which are rigid and homogeneous relative to one another and each of which has a spring member mounting surface.

* * * * *